UNITED STATES PATENT OFFICE.

EDWARD WILLIAM PARNELL AND JAMES SIMPSON, OF LIVERPOOL, COUNTY OF LANCASTER, ENGLAND.

MAKING SODIUM CARBONATES BY SULPHIDES OF THE ALKALINE EARTHS.

SPECIFICATION forming part of Letters Patent No. 382,551, dated May 8, 1888.

Application filed July 8, 1887. Serial No. 243,787. (No specimens.) Patented in England April 22, 1887, No. 5,853.

*To all whom it may concern:*

Be it known that we, EDWARD WILLIAM PARNELL and JAMES SIMPSON, subjects of the Queen of Great Britain, residing at Liverpool, in the county of Lancaster, England, have invented certain new and useful Improvements in the Manufacture of Alkalies and Sulphureted Hydrogen, (for which we have applied for Letters Patent No. 5,853, April 22, 1887, in Great Britain, and nowhere else;) and we do hereby declare that the following is a full, clear, and exact description of the invention, which will enable others skilled in the art to which it appertains to make and use the same.

In the manufacture of alkalies by the process or processes patented by us under United States Patents Nos. 343,673, 343,674, and 343,675, in which ammonia in the form of sulphuret is employed in place of the ammonia ordinarily used in the ammonia-alkali process, it may happen that in certain localities a supply of Leblanc alkali waste may not be available, while sulphate of lime, commonly known as "gypsum," or sulphate of baryta, commonly known as "heavy spar," may be obtainable at a trifling cost.

The object of our invention is to provide a process whereby we render either of the above substances available in making alkali.

For the above purpose we grind gypsum or baryta to about the size of marbles and mix it with about one-third of its weight of slack or other fine carbonaceous matter. We then subject the mixture to a roasting temperature in a furnace constructed so that the material operated on shall not be exposed to an oxidizing atmosphere. During this operation or treatment the charge is agitated by any convenient means in order that there may be intimate contact between the gypsum or baryta and the slack. By this means the sulphate of lime or sulphate of baryta is reduced to a sulphuret, and the said sulphuret is mixed with chloride of ammonium and heated until sulphuret of ammonium is evolved and chloride of calcium or barium remains as a residual. The sulphuret of ammonium is conducted with carbonic-acid gas into a solution of chloride of sodium and bicarbonate of soda and chloride of ammonium is formed.

We claim—

The manufacture of bicarbonate of soda by grinding sulphate of lime or baryta, subjecting it to the action of carbonaceous matter, roasting the mixture in a non oxidizing atmosphere, mixing the sulphuret produced with chloride of ammonium, and heating this mixture and conducting the sulphuret of ammonium evolved together with carbonic-acid gas into a solution of chloride of sodium, substantially as described.

EDWARD WILLIAM PARNELL.
JAMES SIMPSON.

Witnesses:
J. H. HIGHMOELS,
*Secy. Lanc. Alkali & Sulph. Co., Ld., 8 Rumford Place, Liverpool.*
JAMES JOHNSON,
*4 Clayton Square, Liverpool.*